United States Patent
Baker

(10) Patent No.: US 6,551,646 B1
(45) Date of Patent: Apr. 22, 2003

(54) PROCESS FOR FROZEN DAIRY PRODUCT

(76) Inventor: Robert S. Baker, 4395 RFD, Long Grove, IL (US) 60047

( * ) Notice: Subject to any disclaimer, the term of this patent is extended or adjusted under 35 U.S.C. 154(b) by 0 days.

(21) Appl. No.: 09/572,741

(22) Filed: May 17, 2000

(51) Int. Cl.[7] .............................................. A23D 9/007
(52) U.S. Cl. ....................................... 426/565; 426/651
(58) Field of Search ................................ 426/565, 651

(56) References Cited

U.S. PATENT DOCUMENTS

| | | | |
|---|---|---|---|
| 3,922,361 A | | 11/1975 | Vann |
| 3,922,371 A | * | 11/1975 | Julien .......................... 426/565 |
| 4,500,553 A | | 2/1985 | Ligget et al. |
| 4,724,153 A | | 2/1988 | Dulin |
| 4,737,374 A | | 4/1988 | Huber et al. |
| 4,816,283 A | * | 3/1989 | Wade .......................... 426/565 |
| 4,832,976 A | * | 5/1989 | Griffin et al. ................ 426/660 |
| 4,971,824 A | * | 11/1990 | Jonas .......................... 426/565 |
| 5,084,295 A | | 1/1992 | Whelan et al. |
| 5,106,643 A | | 4/1992 | Laufer |
| 5,175,013 A | | 12/1992 | Huang et al. |
| 5,238,696 A | | 8/1993 | Fuisz |
| 5,482,728 A | | 1/1996 | Tapfer et al. |
| 5,516,537 A | | 5/1996 | Fuisz |
| 5,620,732 A | | 4/1997 | Clemmings et al. |
| 5,962,060 A | * | 10/1999 | Farrell ......................... 426/565 |

* cited by examiner

*Primary Examiner*—Milton I. Cano
*Assistant Examiner*—Robert Madsen
(74) *Attorney, Agent, or Firm*—Leon I. Edelson; William C. Clarke; Levenfeld Pearlstein

(57) ABSTRACT

A process for producing a soft frozen fruit flavored dairy product is disclosed. The process requires two freezing steps wherein a flavored concentrate mix is frozen before milk fat is added to the mix. The flavored concentrate mix together with the contained milk fat is then frozen again without mixing or stirring to allow ice crystals to form, preferably of small size, to develop a mouthfeel with components of the fruit flavor.

7 Claims, No Drawings

PROCESS FOR FROZEN DAIRY PRODUCT

BACKGROUND OF THE INVENTION

1. Field of Invention

This invention relates to a process for producing a unique soft frozen fruit flavored dairy product.

2. Description of the Prior Art

Frozen dairy products such as ice cream are typically prepared in a process whereby the ingredients are added to a storage container, blended with mixing, homogenized by means of a homogenizer, cooled within the range of 32° F. to about 40° F., then sent to storage until flavor ingredients can be added. The mix is then frozen at about 21° F., packaged at 21° F., wrapped and finally hardened at a temperature from about −45° F. to −50° F.

Frozen dairy products such as ices and sherbets have been prepared in the same procedure as above with modifications of the process. The mix is prepared by adding the ingredients to water with heating to obtain a solution, which is then cooled. Homogenization is not usually useful. Fruit juices, flavoring, coloring, and acid solutions of fruit acids comprise the flavor and color mixture. The formula for sherbets can comprise an ice cream mix containing milk fat to supply a milk fat content to the sherbet of up to about 3 wt % Rapid agitation of the mix causes air to be incorporated into the product and increases the volume of the product. The mixture is then frozen.

Accordingly, the preparation of conventional frozen dairy products consists of a process wherein the ingredients are added to a storage container, blended with mixing, then mixed with flavoring materials, frozen at a suitable temperature, packaged and wrapped. Hardening of the product can take place at a low temperature.

The popularity of soft frozen ice cream and drinks has led to a desire to produce a soft frozen fruit flavored dairy product with natural fruit flavors. This desire has not been attained, to date, because a soft frozen fruit flavored dairy product has not been acceptable to consumers without the addition of emulsifiers, stabilizers and artificial coloring. When these are added to a base soft frozen dairy product, the flavor of the end product can be tainted or lessened in fullness by the presence of the emulsifier's stabilizers and artificial coloring. The product can have an artificial or off-flavor, not like that of the natural fruit flavor.

A further problem is that if a fruit flavor such as a fruit juice containing a significant amount of water is frozen over a period of time ice crystals develop. Mouth feel is affected by size of ice crystals within the frozen composition. Larger ice crystals coloring. When these are added to a base soft frozen dairy product, the flavor of the end product can be tainted or lessened in fullness by the presence of the emulsifier's stabilizers and artificial coloring. When this are added to a base soft frozen dairy product, the flavor of the end product can be tainted or lessened in fullness by the presence of the emulsifiers, stabilizers and artificial coloring. The end product can have an artificial or off-flavor, not like that of the natural fruit flavor.

A further problem is that if a fruit flavor such as a fruit juice containing a significant amount of water is frozen over a period of time ice crystals develop. Mouth feel is affected by size of ice crystals within the frozen composition. Larger ice crystals import a grainy mouth feel. Smaller ice crystal results in a smoother frozen composition mouthfeel.

In addition, when a person eats a frozen product, the taste buds are partially anesthetized and a sweet fruit flavor tastes more tart. In the adjustment of this taste, the presence of a sweetener such as sucrose affects the viscosity of the solution and the mouth feel of the frozen composition. Aging of the frozen composition in a warming process reduces ice crystal size.

If a milk with a milk fat content of about 5% weight content is added to a warmed ice solution of a frozen fruit water solution of sucrose, fat globules from the milk can coalesce to form a structure of coalesced fat globules in the presence of mixing. The resulting product, on re-freezing of the frozen fruit water solution of sucrose and milk fat to a soft frozen stage, develops a mouthfeel with components of the sweet fruit flavor, the sweetener of sucrose being enhanced by the presence of the coalesced fat globules.

Considerable effort has been expended to develop a soft frozen comestible, which can serve as a frozen dessert. U.S. Pat. No. 3,922,361 to Vann, U.S. Pat. No. 4,500,553 to Ligget, U.S. Pat. No. 4,724,153 to Dulin, U.S. Pat. No. 4,737,374 to Huber, and U.S. Pat. No. 5,084,295 to Whelan disclose frozen food products which are soft-serve products. There is considerable other published art on the subject of frozen desserts. A pertinent text is Ice Cream, Fifth Edition, by R. T. Marshall and W. S. Arbuckle, published by International Thomson Publishing, N.Y., N.Y.

DETAILED DESCRIPTION OF THE INVENTION

A process has been devised for producing a unique soft frozen fruit flavored dairy product. In its broadest form, the process comprises forming a soft frozen fruit flavored intermediate concentrate of the desired consistency based on water, a sweetener, and designated fruit juices. The solution of water, sweetener, and fruit juices is slush frozen at a temperature of less than about −3° F. for a designated period without stirring to permit ice crystals to form of the solution components to obtain a mixture of ice crystals, water, solubilized sucrose and fruit juice components disposed in a continuous liquid phase as a form of the solution components to obtain a mixture of ice crystals, water, solubilized sucrose and fruit juice components disposed in a continuous liquid phase as a water ice without any dairy products present. The water mix is then aged for a sufficient period at a warming temperature to prepare a more slushy water ice without stirring or mixing, thus producing a more slushy water ice. Milk with a milk fat content of about 3 wt. % to 5 wt. % is added to the slush thawed water ice with moderate mixing, without forced introduction of air. The water ice-milk solution is frozen at a temperature of less than about −3° F. for period of time sufficient to permit hydration of the proteins present in the solution. The frozen water ice-milk solution is then packaged into a convenient size. At the point of use, the soft frozen fruit flavored dairy product can be eaten with a spoon as a frozen solid or allowed to melt to a slush frozen consistency and sipped as a drink.

The base concentrate of water, sweetener (sucrose), fruit-juice that is used (for a pineapple juice product) should preferably have the following characteristics:

1.) Brix—61.0° to 75.0° of the sugar (sucrose) water solution. Brix is defined on an arbitrary hydrometer scale for expressing the specific gravity of liquids, especially sugar solutions, according to the formula: specific gravity=400/4000+n) at 15.6° C. wherein n represents the reading on the scale. The Brix reading represents percentages by weight of the sugar in the solution of water and sugar;

2.) Sugar/fruit juice weight ratio—0.65:1 to 0.74:1, preferably 0.69:1 to 0.70:1;

3.) No floating pulp in the fruit juice;
4.) Bottom and suspended pulp in the fruit juice: 9%–11%;
5.) No separation of the fruit juice; and
6.) Brix of the fruit juices utilized—10.0° to 15.0°.

The characteristic of the milk added to the base concentrate should preferably be as follows:

Total fat—3.00 to 5.00 wt %, preferably about 5.00 wt %;

To more clearly define the operation and procedure of this invention, the following description is provided.

The product prepared by the process of the instant invention is by a process requiring two freezing steps concurrent with aging periods wherein the base concentrate containing the water, sweetener, and fruit flavoring is frozen to a soft freeze of a slush consistency. The freezing procedure is performed without mixing or stirring to allow ice crystals to form, preferably of small size and not equal in size. After a designated aging period wherein the base concentrate is exposed to a freezing temperature, the slush frozen base concentrate solution is removed from the freezing chamber and tempered in a warming chamber to cause the small ice crystals to melt but allowing the larger ice crystals to remain as components, thus increasing the slush consistency of the base concentrate solution. The heat treatment facilitates hydration of the base concentrate solution mix particles. Milk with an increased fat content, greater than that of raw milk, is thereupon added to the base concentrate solution with slow mixing to avoid introduction of air into the mix. The base concentrate solution and milk composite solution is frozen and aged to develop mix stability and hydration of the mix particles.

In summary, the instant invention comprises a process for a soft frozen dairy product which process comprises the steps of:

a) Mixing a volume of water of fluid ounces with an equal weight of sucrose sweetener in ounces avoirdupois at a suitable temperature to form a sugar-water solution wherein Brix reading as to percentage of sugar in said sugar-water solution is approximately 61°% to 75°% as measured upon a Brix scale;

b) Adding a fluid volume of a first fruit juice to said sugar-water solution wherein fluid volume of said first fruit juice in fluid ounces is at least twice the fluid volume of said water of said sugar-water solution;

c) Mixing said sugar-water solution and said first fruit juice to form a first mixture without introduction of air into said first mixture;

d) Adding a second fruit juice to said first mixture in an amount lesser than the amount of the first fruit juice and mixing said second fruit juice into said first mixture to form a second mixture without introduction of air into said second mixture;

e) Freezing said second mixture at a temperature of less than −3° F. in a first freezing step in a freezing chamber for a period of time sufficient to cause ice crystals to form and to harden said second mixture;

f) Warming said hardened second mixture in a warming chamber for a period of time sufficient to melt ice crystals formed in said freezing chamber wherein said hardened second mixture is partly melted to slush consistency;

g) Adding a fluid volume of milk of prescribed fat content to said partly melted second mixture to form a third mixture wherein fluid volume of said milk is approximately one-half of liquid volume of said water in said sugar-water solution;

h) Mixing said third mixture without introduction of air into said third mixture;

i) Freezing said third mixture in a second freezing step in a freezing chamber at a temperature of at least −3° F. for a period of time sufficient to cause the frozen dairy product to have a soft-frozen consistency.

Specific details of a preferred procedure are as follows:

1. Specific gravity of the sugar-water solution is 1.195 to 1.210, preferably about 1.205;
2. Temperature of water added to form the sugar-water solution: approximately 180° F. or more, preferably boiling at atmospheric pressure;
3. Temperature of the fruit juices added: 40° F. as to a minimum, preferably 55° F. to 65° F.;
4. Fruit juices added: major component, pineapple juice, orange juice, apple juice, preferably pineapple juice; minor component a citrus fruit juice, preferably lemon juice;
5. Specific gravity of pineapple juice approximately: 1.015; Specific gravity of lemon juice approximately: 1.036;
6. Temperature of sugar, water, pineapple and lemon juice solution: within range of 65° to 80° F., preferably 72° F. to 75° F.;
7. Mixing time of sugar, water, pineapple and lemon juice solution: 30 seconds concurrent with temperature rise to about 77° F.; the mixer is preferably a blender; or stirred by hand.
8. Freezing temperature first freeze: within range of −10° F. to −2° F., preferably about −3° F. for four hours;
9. Hydration of mix particles after first freeze: within range of about 70.0% to about 80% preferably about 76%;
10. Warming chamber temperatures after first freeze period: within range of 70° F. to 80° F., preferably about 76° F., time about 2 hours;
11. Add milk with 3 to 5 weight percentages fat with mixing but without introduction of air;
12. Freezing temperature for second freeze: preferably about −3° F. for at least four hours to allow large ice crystals to form;
13. Hydration of mix particles after second freeze within range of about 70% to 80%, preferably about 75%, viscosity of product approximately 1800 c.p.s.;
14. Package in a suitable container at a temperature lower than −3° F.

The following example illustrates the process of the instant invention and the product resulting therefrom:

EXAMPLE

Sixteen fluid ounces of water are added to sixteen ounces by volume of cane sugar (sucrose) at a water temperature of preferably over 180° F., suitably at a boiling temperature, in a suitable container and mixed until the sugar is dissolved to prepare a sugar-water solution wherein Brix is approximately 68°. In the next step, fruit juice, thirty-two fluid ounces is poured into the sugar-water solution, and mixed without introduction of air. A second addition of a fruit juice, in an amount of about three fluid ounces is then added, with mixing, without the addition of air. The resulting base concentrate is then frozen in a freezing chamber wherein the temperature is at least −3° F. for a period of from four to five hours to allow ice crystals to form and grow. The frozen base concentrate is removed from the freezing chamber and placed in a warming chamber to allow the smaller ice crystals formed in the freezing step to melt but allow the larger ice crystals to remain to obtain a slush consistency. The warming chamber is at a temperature of from 70° F. to about 80° F. The warming period is from one to two hours to allow the base concentrate solution to develop a slush consistency of large ice crystals. Eight fluid ounces of milk with a fat content within the range of from 3 wt. percentage to 5 wt. percentage are added to the base concentrate with mixing without the addition of air. The resulting base concentrate and milk solution is then frozen in a freezing chamber maintained at a temperature of −3° F. for a period of at least three hours.

What is claimed is:

1. A process for preparation of a soft frozen dairy product, the steps consisting essentially of:
   a. Mixing a volume of water of fluid ounces with an equal weight of sucrose sweeter in ounces avoirdupois at a suitable temperature to form a sugar-water solution wherein Brix reading as to percentage of sugar in said sugar-water solution is measured as approximately 61° Brix to 75° as measured upon a Brix scale;
   b. Adding a fluid volume of a first fruit juice to said sugar-water solution wherein fluid volume of said first fruit juice in fluid ounces is at least twice the fluid volume of said water of said sugar-water solution;
   c. Mixing said sugar-water solution and said first fruit juice to form a first mixture without introduction of air into said first mixture;
   d. Adding a second fruit juice to said first mixture in an amount lesser than the amount of the first fruit juice and mixing said second fruit juice into said first mixture to form a second mixture as a base concentrate without introduction of air into said second mixture;
   e. Freezing said second mixture at a temperature of less than −3° F. in a first freezing step in a freezing compartment for a period of time sufficient to cause ice crystals to form and to harden said second mixture;
   f. Warming said hardened second mixture in a warming chamber for a period of time sufficient to melt small ice crystals formed in said freezing chamber wherein said hardened second mixture is partly melted to slush consistency;
   g. Adding a fluid volume of milk of prescribed milk fat content to said partly melted second mixture to form a third mixture wherein fluid volume of said milk is approximately one-half of liquid volume of said water in said sugar-water solution;
   h. Mixing said third mixture without introduction of air into said third mixture to cause the solution to form a structure of coalesced fat globules in the presence of mixing; and
   i. Freezing and aging said third mixture of base concentrate solution and milk composite solution in a second freezing step in a freezing chamber at a temperature of at least −3° F. for a period of time sufficient to cause the frozen dairy product to develop mix stability and hydration of the mix particles and have a soft-frozen consistency.

2. The process of claim 1 wherein said first fruit juice is selected from the group consisting of pineapple juice, apple juice, and orange juice.

3. The process of claim 1 wherein said second fruit juice comprises juice of a citrus fruit.

4. The process of claim 3 wherein said juice comprises lemon juice.

5. The process of claim 1 wherein prescribed fat content of said milk is within the range of from about 3 weight percent to about 5 weight percent.

6. The process of claim 1 wherein fluid volume of said water is approximately 16 ounces, weight of said sucrose sweetener is approximately 16 ounces avoirdupois, fluid volume of said first fruit juice is approximately 32 fluid ounces, fluid volume of said second fruit juice is approximately 3 fluid ounces, freezing of said second mixture in a first freezing step at a temperature of less than about −3° F. is for a period of from four to five hours, warming of said hardened second mixture is over a period of from one to two hours at a temperature within the range of from about 70° F. about 80° F., fluid volume of said milk added to said second mixture to form said third mixture is approximately 8 fluid ounces, freezing of said third mixture in a second freezing step at a temperature of less than about −3° F. for a period of at least three hours.

7. The process of claim 1 for the manufacture of soft frozen dairy product further comprising the steps of a) forming a soft frozen base concentrate of water, a sweetener, and fruit juice, thawing said concentrate to substantially slush consistency and then b) adding milk of predetermined fat content over that of raw milk within the range of from about 3 wt % fat to 5 wt % fat content and c) subsequently freezing said soft frozen base concentrate with added milk of said fat content to a slush frozen product wherein said soft frozen base concentrate and the said soft frozen base concentrate with added milk have the following characteristics:
   a. Soft frozen base concentrate of water sweetener and fruit juices:
      1. Brix=61.0° to 75.0°
      2. Sugar/fruit weight ratio=0.65:1 to 0.74:1
      3. Particle hydration: 70.0% to 80.0%
   b. Soft frozen base concentrate with milk
      1. Brix=61.0° to 75.0°
      2. Particle hydration: 70.0% to 80.0%
      3. Viscosity: about 1800 c.p.s.

* * * * *